(12) United States Patent
McCutchen (10) Patent No.: US 8,312,894 B2
(45) Date of Patent: Nov. 20, 2012

(54) AMBIENT AIR BACKFLUSHED FILTER VACUUM

(76) Inventor: David L. McCutchen, Sand Springs, OK (US)

( * ) Notice: Subject to any disclaimer, the term of this patent is extended or adjusted under 35 U.S.C. 154(b) by 0 days.

(21) Appl. No.: 13/295,968

(22) Filed: Nov. 14, 2011

(65) Prior Publication Data

US 2012/0056119 A1    Mar. 8, 2012

Related U.S. Application Data (63) Continuation of application No. 11/494,040, filed on Jul. 27, 2006, which is a continuation of application No. 10/623,356, filed on Jul. 18, 2003, now Pat. No. 7,082,640.

(51) Int. Cl.
  *F16K 11/044*      (2006.01)
(52) U.S. Cl. .................. 137/625.5; 137/614.13
(58) Field of Classification Search .......... 137/625.5, 137/625.48, 614.13, 862, 871, 878
  See application file for complete search history.

(56) References Cited

U.S. PATENT DOCUMENTS

| | | | |
|---|---|---|---|
| 1,784,339 A | 12/1930 | Clasen et al. | |
| 3,111,960 A * | 11/1963 | Marmo | 137/315.03 |
| 3,653,188 A | 4/1972 | Fisher et al. | |
| 3,653,190 A | 4/1972 | Lee et al. | |
| 3,735,566 A | 5/1973 | Laliwala | |
| 3,853,517 A | 12/1974 | Mitchell | |
| 3,921,250 A | 11/1975 | Jerabek | |
| 3,949,777 A * | 4/1976 | Caldwell | 137/271 |
| 4,268,288 A | 5/1981 | Coombs | |
| 4,275,731 A | 6/1981 | Nichols | |
| 4,329,161 A | 5/1982 | Osborn | |
| 4,465,497 A | 8/1984 | Howeth | |
| 4,533,371 A | 8/1985 | Nakamura | |
| 4,618,352 A | 10/1986 | Nelson | |
| 4,755,194 A | 7/1988 | Rooker et al. | |
| 5,108,473 A | 4/1992 | Hayden, Sr. | |

(Continued)

FOREIGN PATENT DOCUMENTS

| | | |
|---|---|---|
| DE | 41 38 223 C1 | 2/1993 |
| GB | 724 927 A | 2/1955 |

OTHER PUBLICATIONS

Patent Cooperation Treaty International Bureau—International Preliminary Report on Patentability dated Feb. 2, 2006, Geneva, Switzerland.

(Continued)

*Primary Examiner* — John Fox
*Assistant Examiner* — Seth Faulb
(74) *Attorney, Agent, or Firm* — Gable Gotwals (57) ABSTRACT

A vacuum cleaning machine has a cannister with an inlet port and at least two outlet ports. At least two filters are disposed inside of the cannister, one in pneumatic communication through each of the outlet ports. At least two valves are disposed outside of the cannister. Each valve is in pneumatic communication between a vacuum source and an outlet port so as to permit air to be drawn by the vacuum source from the inlet port simultaneously through the filters. A controller operates the valves to switch the filters from the vacuum source to ambient air so as to permit ambient air to be sequentially intermittently drawn through corresponding valves and filters into the cannister. Preferably, the controller includes a timing mechanism for setting the delay time of the sequential valve operation and a timing mechanism for setting the intermittent time of connection of each filter to ambient air.

12 Claims, 6 Drawing Sheets

U.S. PATENT DOCUMENTS

| | | | |
|---|---|---|---|
| 5,179,977 A * | 1/1993 | Iwata et al. | 137/625.5 |
| 5,868,807 A | 2/1999 | Luy et al. | |
| 5,948,127 A | 9/1999 | Minakawa et al. | |
| 5,961,675 A | 10/1999 | Son et al. | |
| 6,090,175 A | 7/2000 | Richard | |
| 6,440,197 B1 | 8/2002 | Conrad et al. | |
| 6,458,178 B1 | 10/2002 | Dietz et al. | |
| 6,475,256 B2 | 11/2002 | Matsubara et al. | |
| 6,767,380 B2 | 7/2004 | von Stackelberg, Jr. | |
| 6,830,599 B1 | 12/2004 | McCutchen | |
| 7,044,999 B2 | 5/2006 | Bankstahl et al. | |
| 2002/0194996 A1 | 12/2002 | Peter et al. | |
| 2003/0041729 A1 | 3/2003 | Finigan | |
| 2003/0089234 A1 | 5/2003 | Bjarno et al. | |
| 2004/0055470 A1 | 3/2004 | Strauser et al. | |

OTHER PUBLICATIONS

International Search Report dated Mar. 28, 2005—PCT Application PCT/US04/22981.

Written Opinion of the International Searching Authority dated Mar. 28, 2005—PCT Application PCT/US04/22981.

Supplementary European Search Report under Article 157(2)(a) EPC dated Sep. 22, 2006.

* cited by examiner

AMBIENT AIR BACKFLUSHED FILTER VACUUM

This application is a continuation application claiming priority to U.S. patent application Ser. No. 11/494,040, filed Jul. 27, 2006, entitled AMBIENT AIR BACKFLUSHED FILTER VACUUM, which is a continuation application claiming priority to U.S. patent application Ser. No. 10/623,356, filed Jul. 18, 2003, which issued as U.S. Pat. No. 7,082,640 on Aug. 1, 2006, entitled AMBIENT AIR BACKFLUSHED FILTER VACUUM.

BACKGROUND OF THE INVENTION

This invention relates generally to vacuum cleaning equipment and more particularly concerns a vacuum cleaner having filters backflushed with ambient air.

Cleaning filtered vacuums is presently accomplished by shaker, percussion, forced air or compressed air systems. Such systems periodically apply mechanical or pneumatic forces to dislodge particles collected on the intake surfaces of the filters. To accomplish this, a force system other than the primary vacuum system is required, such as a second blower motor, a compressor or a shaker or percussion system motor. These added components make backflushed vacuums considerably more expensive and more readily subject to malfunction.

Except for very expensive complex 240 volt systems, these systems are mechanically controlled. Therefore, they have limited flexibility in their operating parameters. While their cycle time can be varied, perhaps by changing the rotational speed of a cam, the fractional relationship of the backflush time to full cycle time can only be changed by an exchange of mechanical components, such as the cam drive motor. The efficiency of the backflush cycle, however, is dependent on the proper coordination of the cycle and backflush times to the characteristics of the particular medium being vacuumed. For example, a short burst of backflushed air will clean dust collected on a filter, but a longer burst is necessary to dislodge particles of plastic or fibers.

These problems are exacerbated because these systems generally exhibit considerable turbulence within the collecting cannister, and as a result the same particles are often continuously recycled, unnecessarily overloading the backflush system.

It is, therefore, an object of this invention to provide a backflushed filter vacuum which uses ambient air to backflush the filters. Another object of this invention is to provide a backflushed filter vacuum which does not require use of a secondary shaker, percussion, forced air or compressed air system. A further object of this invention is to provide a backflushed filter vacuum which can be controlled by an electronic system economically compatible with a relatively inexpensive 120 volt machine. Yet another object of this invention is to provide a backflushed filter vacuum which permits independent control of both cycle and backflush time. It is also an object of this invention to provide a backflushed filter vacuum which permits cycle and backflush times to be varied relative to each other without interchanging mechanical components. Still another object of this invention is to provide a backflushed filter vacuum which permits the user to adjust cycle and backflush times to suit the medium being vacuumed. An additional object of this invention is to provide a backflushed filter vacuum which reduces the likelihood of recycling particles through the filters.

SUMMARY OF THE INVENTION

In accordance with the invention, a vacuum cleaning machine has a cannister with an inlet port and at least two outlet ports. At least two filters are disposed inside of the cannister, one in pneumatic communication through a corresponding one of each of the outlet ports. At least two valves are disposed outside of the cannister. Each valve is in pneumatic communication between a vacuum source and a corresponding outlet port so as to permit air to be drawn by the vacuum source from the inlet port simultaneously through the filters. A controller operates the valves to switch the filters from connection to the vacuum source to connection to ambient air so as to permit ambient air to be sequentially intermittently drawn through corresponding valves and filters into the cannister. Preferably, the controller includes a timing mechanism for setting the delay time between cycles of the sequential valve operation and a timing mechanism for setting the intermittent time of connection of each filter to ambient air.

The preferred valve has a housing with a continuously opened port and two reciprocally opened and closed ports. A piston disposed between the two ports is biased to a first position in which one of the two ports is closed and the other of the two ports is opened. A mechanism for overcoming the bias moves the piston to a second position in which the closed port is opened and the opened port is closed. The preferred bias overcoming mechanism is a solenoid with a switch. The continuously opened port is in pneumatic communication with the filter. One of the two reciprocal ports is in pneumatic communication with the vacuum source and the other with ambient air. When the solenoid is energized, the valve connects its filter to ambient air. When the solenoid is de-energized, the valve connects its filter to the vacuum source.

In a specially preferred embodiment, the vacuum cleaning machine has a cannister with an opening in its top and an inlet port. A plate closes the opening. The plate has three outlet ports. Three filters are mounted on the plate and disposed inside of the cannister, one in pneumatic communication through a corresponding one of each of the outlet ports. A vacuum source and three valves are also mounted on the plate outside of the cannister. Each valve has a first port in continuously opened pneumatic communication with a corresponding outlet port, a second port in pneumatic communication with the vacuum source and a third port in pneumatic communication with a source of ambient air. A piston reciprocally disposed between the second and third ports is biased by a coil spring to simultaneously close the third port and open the second port in a vacuum mode. A solenoid overcoming the bias reciprocates the piston to simultaneously close the second port and open the third port in a backflush mode. The controller causes the valves to sequentially switch the filters from communication with the vacuum source to communication with ambient air for a preset time. The controller is preferably configured to allow the operator to set the cycle time of the sequential valve operation and also to set the intermittent time of connection of the filters to ambient air.

Preferably, the cannister also contains a mechanism cooperable with the inlet port to divide the cannister into an upper zone of high velocity vortex air flow and a lower zone of reduced velocity air flow so as to reduce the likelihood of recycling particles through the filters. This can be achieved by positioning the inlet port below the filters and above the bottom of the cannister using a duct to redirect air flow downwardly in the cannister from the inlet port and using a baffle to redirect the downward flow to a circumferential flow.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
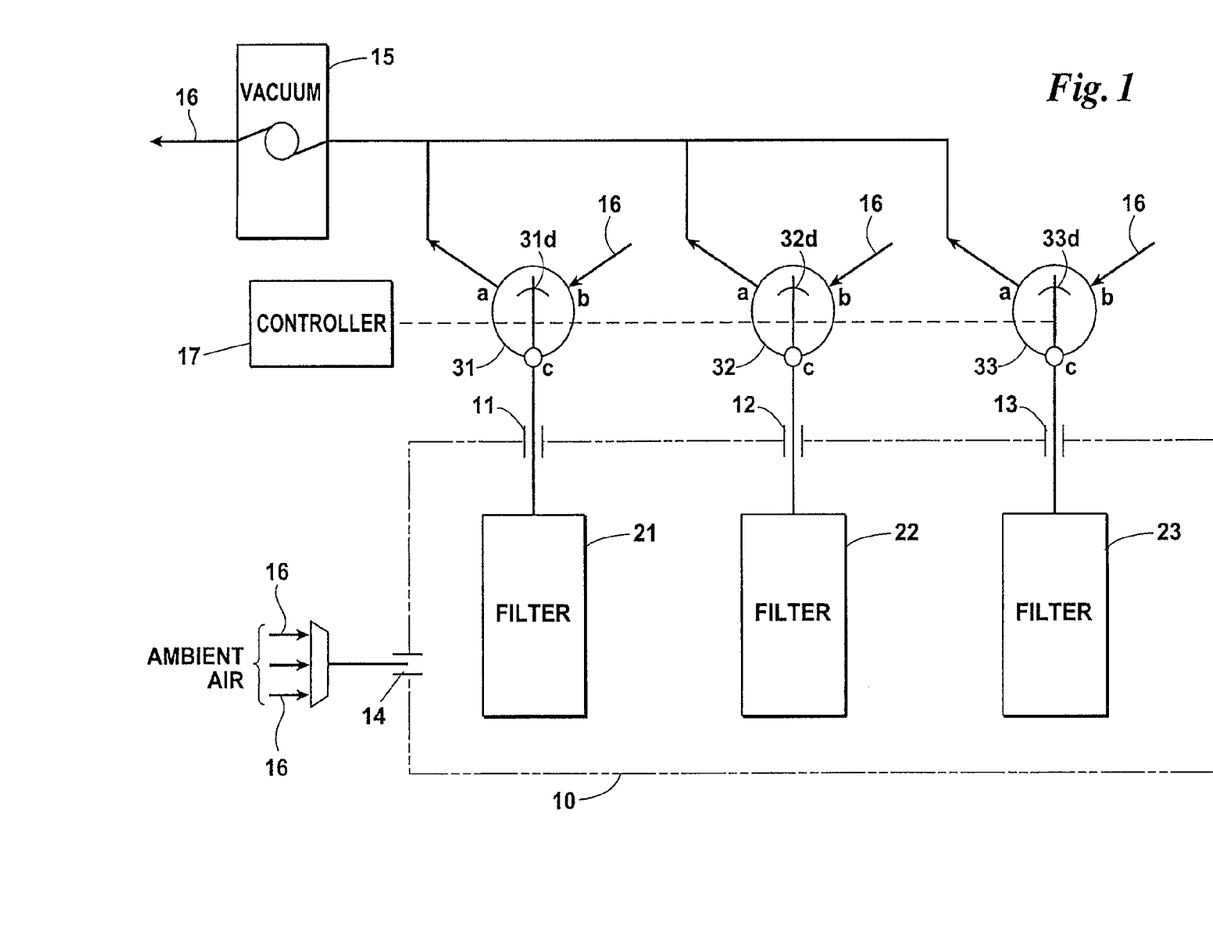
FIG. 1 is a block diagram of the ambient air backflushed filter vacuum.

Turning first to FIG. 1, the ambient air backflushed filter vacuum generally includes a cannister 10 with three, outlet ports 11, 12 and 13 and an inlet port 14. Three filters 21, 22 and 23 are disposed within the cannister 10 and three valves 31, 32 and 33 are disposed outside of the cannister 10. Each of the valves 31, 32 and 33 has a continuously opened port 31c, 32c or 33c which is in constant communication through a respective outlet port 11, 12 or 13 with a respective filter 21, 22 or 23. Each valve 31, 32 and 33 also has two reciprocally opened and closed ports 31a and 31b, 32a and 32b and 33a and 33b, respectively, and an operating mechanism 31d, 32d and 33d, respectively, for switching the valves 31, 32 and 33 between their reciprocal ports "a" and "b". One reciprocal port "a" of each of the valves 31, 32 and 33 is connected to a vacuum source 15 and the other reciprocal port "b" of each of the valves 31, 32 and 33 is in pneumatic communication with a source of ambient air 16. A controller 17 causes the operating mechanisms 31d, 32d and 33d to sequentially operate to switch the filters 21, 22 and 23 from pneumatic communication with the vacuum source 15 to pneumatic communication with ambient air 16. Each of the valves 31, 32 and 33' is normally connected so that the vacuum source 15 draws ambient air 16 through the cannister inlet port 14 into the cannister 10 and through the walls of the filters 21, 22 and 23. The controller 17 then sequentially causes the valves 31, 32 and 33 to switch to the ambient air port "b". When, for example, one valve 31 is in this backflushed mode through its ambient air port "b", the other valves 32 and 33 continue in the vacuum mode through their respective vacuum ports "a". The suction through the filters 22 and 23 draws ambient air 16 through the valve port 31 "b" and into the filter 21, reversing the flow of air through the filter 21 and causing particles that have collected on the outer wall of filter 21 to be dislodged to drop to the bottom of the cannister 10. After a brief, predetermined backflush time, the controller 17 will cause the first valve 31 to return to its vacuum port "a" so as to resume the vacuum mode through all three filters 21, 22 and 23. After another predetermined time lapse, the controller 17 will sequentially perform the same operation on a second valve 32, so that the other valves 31 and 33 cause the second filter 22 to be backflushed. When the second filter 22 has been backflushed for the predetermined time period and the delay time has elapsed, the controller 17 will then cause the same operation to occur with respect to the third filter 23. The cycle continues for as long as the vacuum source 15 is in operation. When the third filter 23 has been backflushed, the controller 17 will delay for a predetermined time period before reinitiating the cycle. Preferably, and as hereinafter explained, the controller 17 is configured so as to allow the user to select both the delay time and the backflush time for the system.

Figure 2:
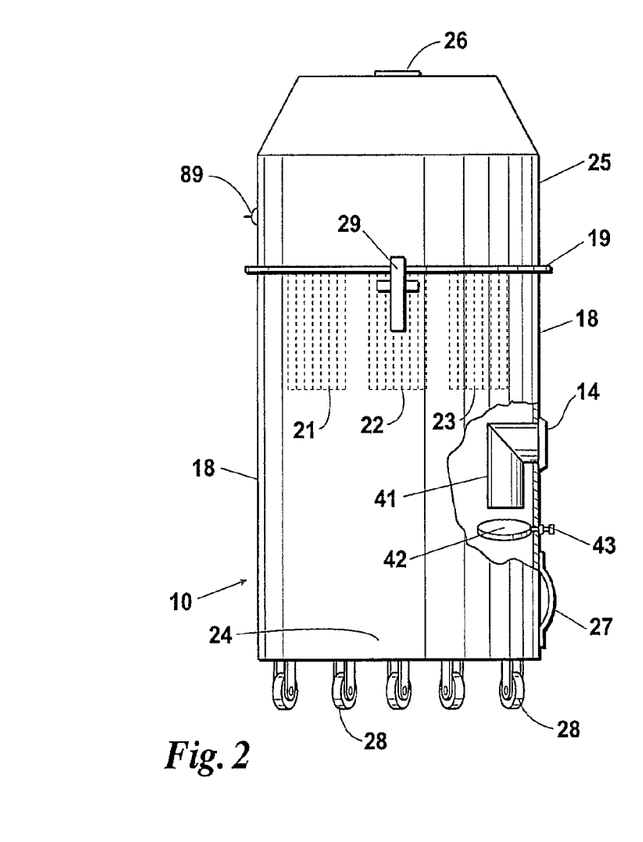
FIG. 2 is a side elevation of the ambient air backflushed filter vacuum.

Turning now to FIG. 2, the structural configuration of the cannister 10 is illustrated. The cannister 10 is a cylindrical container having side walls 18, a bottom 24 and an open top. The open top is covered by a circular plate 19. The filters 21, 22 and 23 are mounted to the bottom of the plate 19 and pneumatically communicate through the outlet ports 11, 12 and 13 in the plate 19. The inlet port 14 to the cannister 10 extends through its side wall 18, as shown at a point below the bottom of the filters 21, 22 and 23 and above the bottom 24 of the cannister. The valves 31, 32 and 33, the operating mechanisms 31d, 32d and 33d, the controller 17 and the vacuum source 15 are mounted above the plate 19 and are protected by a cover 25 which is seated on the plate 19. An opening 26 is provided in the cover 25 to exhaust air discharged from the vacuum source 15. A handle 27 is provided proximate the bottom of the cannister 10 to facilitate lifting and handling of the unit. Casters 28 at the bottom 24 of the cannister 10 allow the cannister 10 to be freely rolled in any direction. Latches 29 permit removal of the cover 25 and the plate 19 from the cannister 10 to allow access to the interior of the cannister 10 and the filters 21, 22 and 23.

Continuing to look at FIG. 2, an assembly for maximizing the efficiency of airflow within the cannister 10 during use is also seen. A duct 41 is provided inside the cannister 10 to redirect air flow through the inlet port 14 downwardly and proximate the side wall 18 of the cannister 10. The inlet port 14 can be above the bottom level of the filters 21, 22 and 23 as long as the duct 41 extends below the filters 21, 22 and 23. A baffle 42 is positioned within the cannister 10 slightly below the outlet end of the duct 41. The baffle 42 is sized to provide a barrier to the path of air flow from the duct 41. As shown, the baffle 42 is secured to the cannister wall 18 by an external bolt 43 which can be loosened to permit changing the angle of inclination of the baffle 42 from horizontal. The baffle 42 redirects the air flow into a circular vortex above the baffle 42. Below the baffle 42, air flow velocities are considerably reduced and there is little turbulence. As a result, when particles filtered by the filters 21, 22 and 23 are backflushed from the filters 21, 22 and 23, the particles settle to the bottom 24 of the cannister 10 and are far less likely to be recycled through the filters 21, 22 and 23. It has been found that a baffle angle of 10 degrees from horizontal works effectively, though this angle may be varied considerably.

Figure 3:
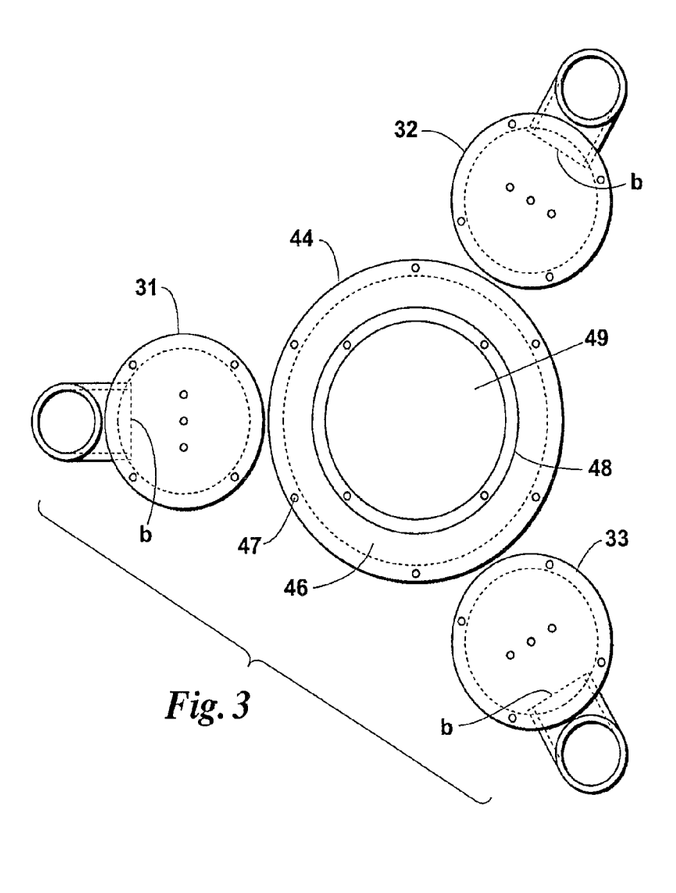
FIG. 3 is a top plan view of the backflushed filter vacuum pneumatics.

Turning now to FIG. 3, a preferred embodiment of the valves 31, 32 and 33 and their operating mechanisms is illustrated. A central housing 44 is preferably concentrically located on top of the circular plate 19 covering the cannister 10. The central housing 44 may be fixed to the plate 19 by screws 45 and a plate 46 covering the central housing 44 is also fastened to the housing 44 by screws 47. A concentric motor mount spacer 48 is fastened to the top of the central housing cover plate 46 and extends upwardly to and supports the mount 49 for the vacuum source 15. The valves 31, 32 and 33 are concentrically disposed about the central housing 44, preferably displaced at equal angles. Thus, as shown, for the three valve configuration, the valves 31, 32 and 33 are at 120 degree intervals about the center of the central housing 44.

Figure 4:
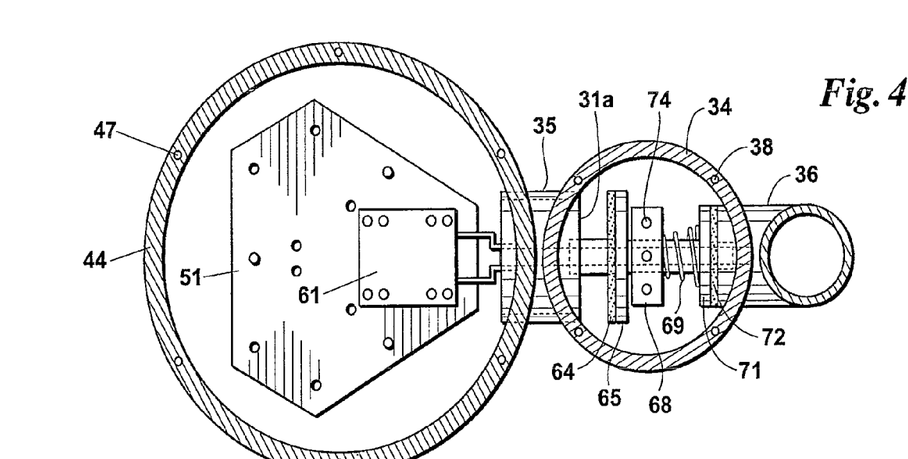
FIG. 4 is a top plan view of a typical valve of the backflushed filter vacuum.
Figure 5:
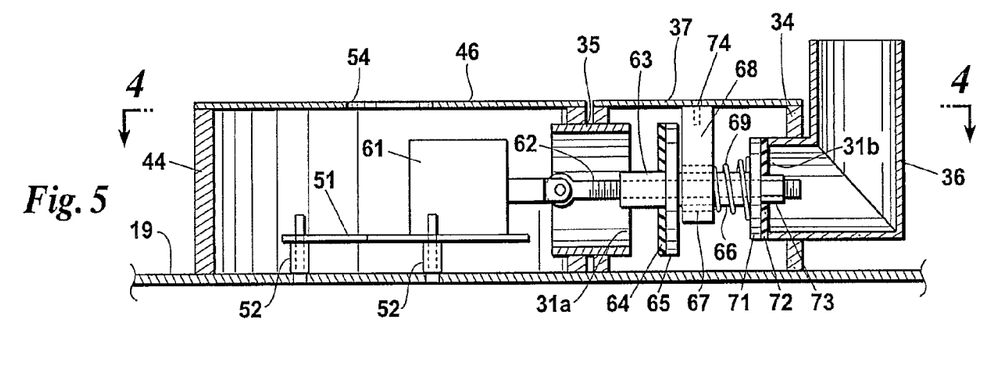
FIG. 5 is a side elevation view of the valve of FIG. 4.

The configuration of each of the valves 31, 32 and 33 is shown in FIGS. 4 and 5 and is explained in relation to one of the valves 31. The other valves 32 and 33 are in all respects identical to the valve 31 now described. A mounting plate 51 is fixed to the cannister plate 19 at an elevation determined by standoffs 52. The valve 31 is formed by a cylindrical housing 34 also fastened to the cannister plate 19 by screws. The central housing 46 is connected to the valve housing 34 by a radial duct 45. The ambient air port 31b is radially aligned with the duct 35 which forms the vacuum port 31a for the valve 31. The ambient air duct 36 extends from the ambient air port 31b into the source of ambient air 16. The valve housing 34 is completed by a cover 37 fastened to the top of the housing 34 by screws 38.

The operating mechanism 31d for the valve 31, shown generally in FIG. 1, is also shown in greater detail in FIGS. 4 and 5. A solenoid 61 is mounted on a plate 51 with the solenoid shaft 62 aligned on the radius extending through the central axis of the ducts 35 and 36. The remainder of the operating mechanism 31d is best understood in relation to the manner in which it is assembled. The solenoid shaft 62 has a threaded portion on which is threaded a bolt 63. A gasket 64 and valve plate 65 slide over the shaft 62 with the plate 65 against the bolt 63 and the bolt 63 seated in a hole in the gasket 64. The gasket 64 and plate 65 are configured to cover the vacuum port 31a of the valve 31. A sleeve 66 slides over the shaft 62 against the valve plate 65. An integral bushing 67 and bracket 68 slide over the sleeve 66 and a spring 69 slides over the sleeve 66 and against the bushing 67. A second valve plate 71 and gasket 72 slide onto the shaft 62 and against the sleeve 66. A nut 73 is tightened onto the threaded end of the shaft 62 and seats in a hole in the gasket 72 against the second plate 71. The second valve plate 71 and gasket 72 are configured so as to cover the ambient air port 31b of the valve 31. The valve plates 65 and 71 taken together form a piston of a length determined by the length of the sleeve 66. The bracket 68 is fastened to the valve cover 37 by screws 74. The travel of the piston is therefore determined by the spacing of the vacuum port 31a and the ambient air port 31b. The solenoid 61 and the spring 69 are coordinated so the spring 69 exerts 2.3 psi against the second valve plate 71 in its preloaded condition and can be fully compressed at 4 psi. The spring 69 normally holds the ambient air port 31b closed and the vacuum air port 31a opened. When the solenoid 61 is energized, its pull overcomes the spring 69 to shift the piston to close the vacuum port 31a and open the ambient air port 31b of the valve 31.

As seen in FIG. 4, additional solenoids can be mounted at 120 degree intervals on the solenoid mounting plate 51 to serve the remaining valves illustrated in FIG. 3. Coordinated selection of the solenoid 61, the spring 69, the diameter of the valve housing 34 and the length of the piston defined by the valve plates 65 and 71 and the sleeve 66 in the above described assembly procedure automatically establishes the piston travel distances and preloads the appropriate spring compression. Upon energizing the solenoid 61, the bias of the spring 69 is overcome and the solenoid 61 quickly pulls the piston to close the vacuum port 31a and open the ambient air port 31b of the valve 31. A central opening 54 in the cover plate 46 in the central housing 44 allows pneumatic communication through the cylindrical spacer 48 to the vacuum source 15. All of the housing and duct components are sealed at their connections to assure the pneumatic integrity of the system.

Figure 6:
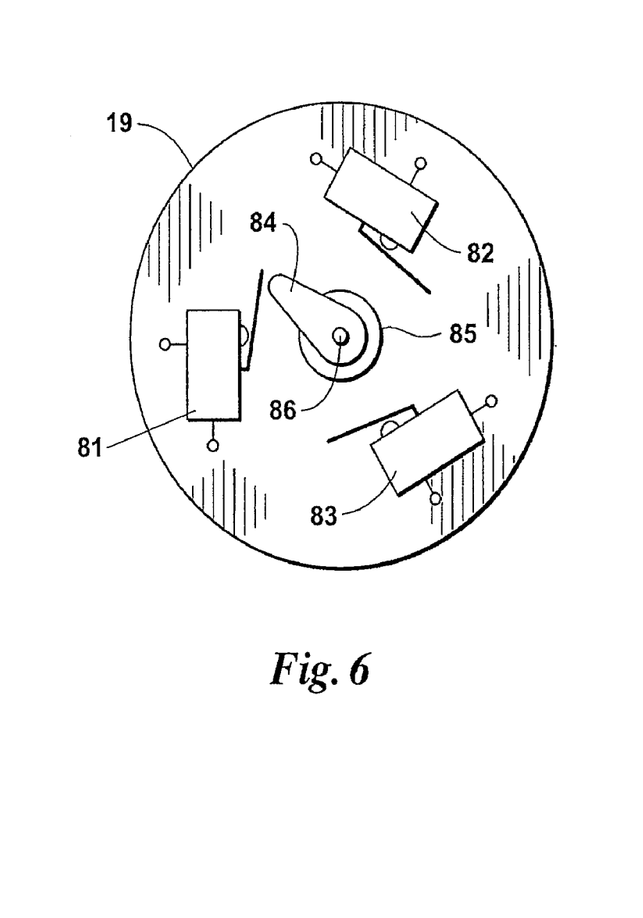
FIG. 6 is a plan view of an electro-mechanical control system for the backflushed filter vacuum valves.
Figure 7:
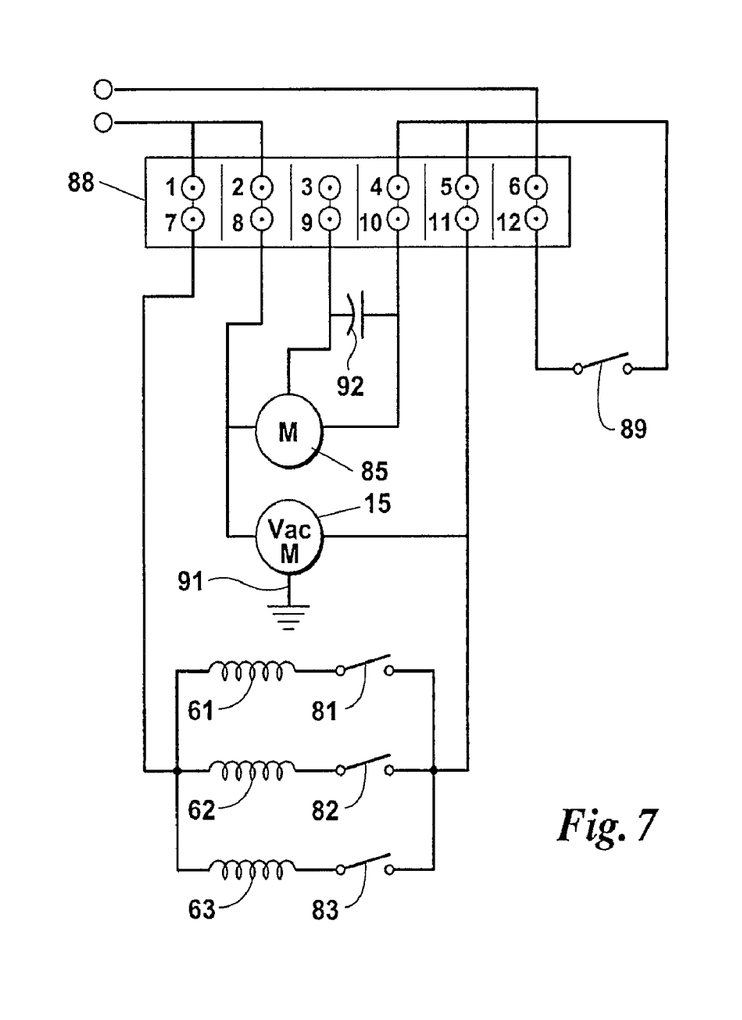
FIG. 7 is a schematic electrical diagram of the electro-mechanical system of FIG. 6.

Turning now to FIGS. 6 and 7, an electro-mechanical embodiment of the controller 17 is illustrated. In this embodiment solenoids 61, 62 and 63 are controlled by switches 81, 82 and 83, respectively, which are operated by a cam 84 driven by a geared cam motor 85 connected to the cam 84 by a drive shaft 86. The cycle time for operation of the switches 81, 82 and 83 by the cam 84 is not adjustable without a change of structural components, such as selection of a motor with a different rpm. The components of the controller 17 are connected as illustrated through a terminal block 88. The vacuum source 15 and main power on/off switch 89 are also connected via the terminal block 88. The vacuum motor 15 is grounded 91 and the cam motor 85 is provided with a capacitor 92 to assist in operation of the motor 85. When the machine main power switch 89 is turned on, the vacuum motor 15 and cam motor 85 are both energized. As long as the switches 81, 82 and 83 remain open, the solenoids 61, 62 and 63 remain de-energized and all of the filters 21, 22 and 23 are connected to the vacuum source 15 through the valve vacuum ports 31a, 32a and 33a. As the cam 84 rotates to engage the next of the switches 81, 82 or 83 in its path, the solenoids 61, 62 and 63 are sequentially energized to close their respective vacuum ports 31a, 32a and 33a and to open their ambient air ports 31b, 32b or 33b, respectively, so as to connect their respective filters 21, 22 or 23 to ambient air 16. The filter 21, 22 or 23 will be backflushed for as long as their associated solenoids 61, 62 or 63 remain energized, a period determined by the relation of the cam 64 to the contact elements of the switches 81, 82 or 83. As shown in FIG. 6, the controller 17 and its components are mounted on the cannister plate 19.

Figure 8:
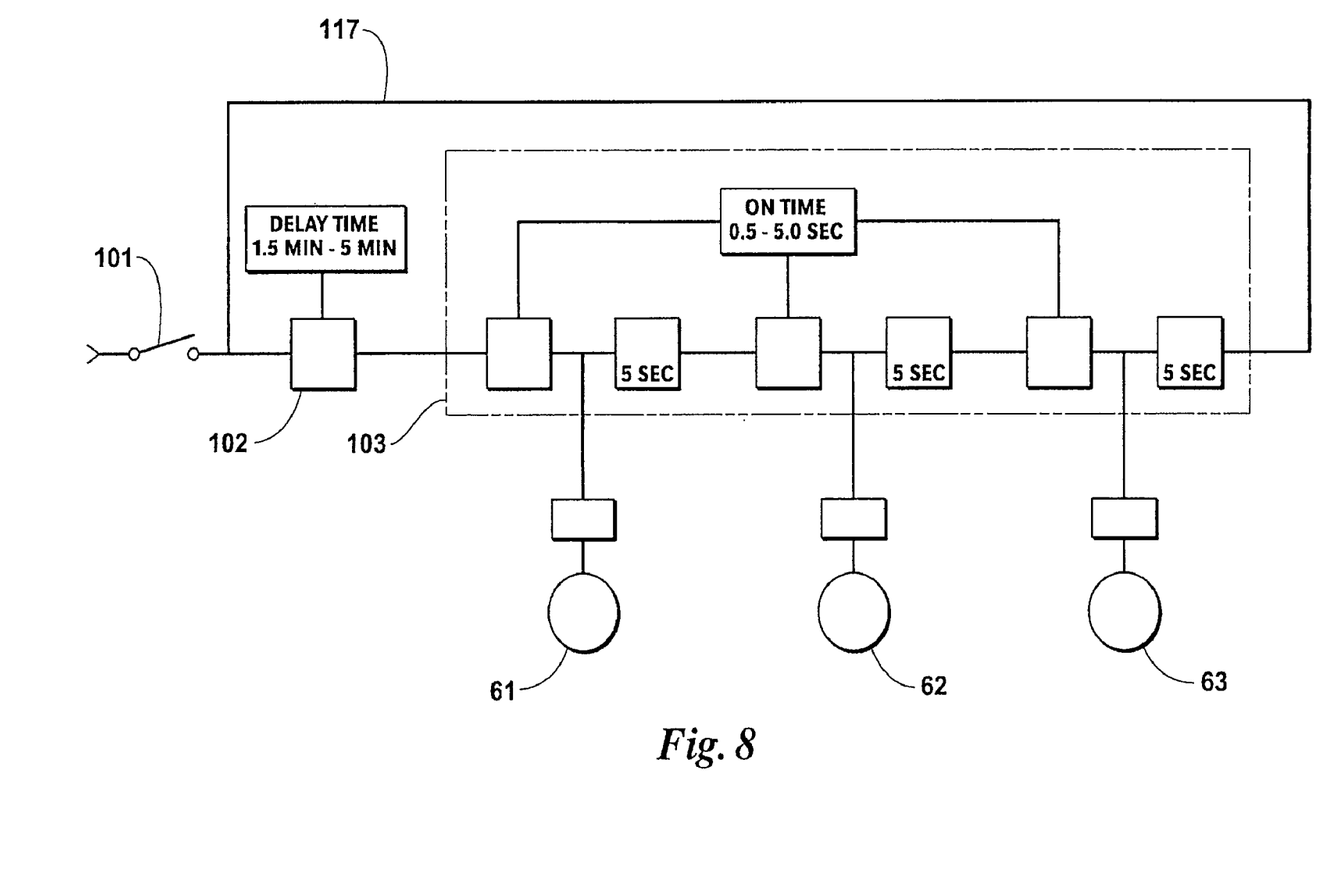
FIG. 8 is a block diagram of an electronic control system for the backflushed filter vacuum valves.
Figure 9:
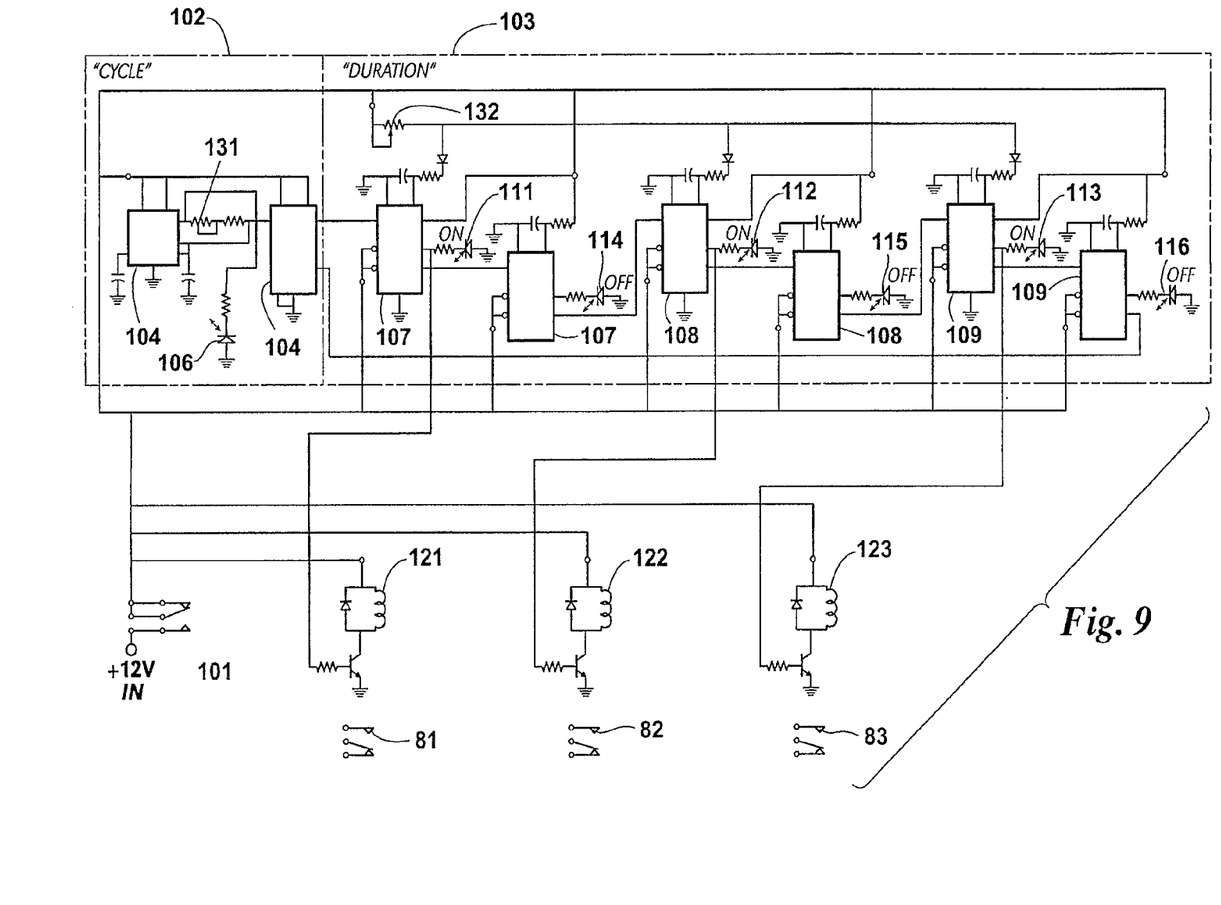
FIG. 9 is a schematic diagram of the electronic control system of FIG. 8.

Turning now to FIGS. 8 and 9, an electronic embodiment of the controller 17 is illustrated. In this embodiment, when the system main power switch is turned on, the controller power switch 101 is also turned on. The controller consists essentially of two timers 102 and 103. The first timer 102 establishes the delay time between activation of the solenoids 61, 62 and 63. The second timer 103 establishes the "on" time for each of the solenoids 61, 62 and 63 and an "off" time before the next solenoid 61, 62 or 63 is energized. The use of this embodiment has the added advantage of allowing the user by means of the first timer 102 to select the delay time between sequential operations of the solenoids 61, 62 and 63. The user is also permitted through the second timer 103 to select the "on" time, as shown from 0.5 to 5.0 seconds, for each of the solenoids 61, 62 and 63 so that each filter 21, 22 and 23 will receive one burst of backflushing ambient air for the selected backflush time interval. The time between solenoid operations is also set by the backflush timer 103 and may be, but as shown is not, variable by the user. As shown, an "off" time of 5 seconds is selected. This can be set at any value by the manufacturer. Assuming for example, an "off" time of 0.5 seconds, the delay timer 102 being set for 3 minutes and the backflush timer 103 being set for 10 seconds, the total cycle time will be 3 minutes 45 seconds. That is, every 3 minutes and 45 seconds, each filter 21, 22 and 23 will be backflushed once.

As seen in FIG. 9, when power is applied, the delay timer 102 starts. The delay time can be set from 1.5 to 5 minutes by the operator with a screw driver adjusted potentiometer 131 or some other type device. When the delay timer 102 times out, it starts the backflush timer 103. The second timer 103 operates the control relays 121, 122 and 123 which actuate the switches 81, 82 and 83 to pick up the solenoids 61, 62 and 63. Each solenoid 61, 62 and 63 is energized sequentially during the cycle. The duration "on" time for each solenoid 61, 62 and 63 is adjustable from 0.5 seconds to 5 seconds with an operator controlled screw driver adjusted potentiometer 132 or some other device. Duration "on" time is the same for all solenoids 61, 62 and 63 once set. At the end of the cycle, the delay timer 102 is reinitiated. This cycling continues until power is turned off. Preferably, the delay timer 102 employs a single dual pressure monostable multi-vibrator 104 with a variable resistor 131 to permit delay time adjustment by the user. An LED 106 is provided as confirmation of operation of the delay timer 102. The backflush timer 103 employs three such multi-vibrator chips 107, 108 and 109 in a cascaded configuration with LED's 111, 112 and 113 and 114, 115 and 116, respectively, to indicate the ON/OFF condition of each of the control relays 121, 122 and 123 which, in turn, pick up the switches 81, 82 and 83 for their respective solenoids 61, 62 and 63.

A prototype of the ambient air backflushed filter vacuum was satisfactorily tested with the following components:

| Element | Component | Description |
|---|---|---|
| 10 | cannister | 18¼" I.D. × 22" H 16 gauge carbonate steel |
| 15 | vacuum source | 2-stage 110 volt AC 115 cfm vacuum motor |
| 19 | plate | 19¼" diameter 10-gauge galvanized cold rolled sheet metal |
| 21, 22, 23 | filters | 99.8% at 0.2 micron cartridge filters |
| 25 | cover | 20" diameter × 11" H ABS plastic |
| 34 | valve housings | 3" diameter schedule 40 PVC plastic |
| 35 | ducts | 2" diameter schedule 40 PVC plastic |
| 36 | ducts | 1½41 diameter schedule 40 PVC plastic |
| 44 | central housing | 6" diameter schedule 40 PVC plastic |
| 48 | spacer | 4" diameter schedule 40 PVC plastic |
| 61, 62, 63 | solenoids | 110 volt AC/pull rate of 4# at 0.5" stroke |
| 64 | gaskets | closed cell PVC foam |
| 65 | valve plates | 16 gauge cold rolled sheet metal |
| 66 | sleeves | ¼" diameter × 1¼" aluminum spacers |
| 67/68 | bushing/bracket | HMHD polypropylene/high impact plastic |
| 69 | spring | conical compression spring/1¾" compressed to ¾" at 2.3 psi and fully compressed at 4 psi |
| 85 | cam motor | 4 rpm geared AC motor |
| 104 | multi-vibrator | 555/4541 |
| 107, 108, 109 | multi-vibrator | 4538 |

While the machine has been described in relation to a three filter system, the machine could employ any number of filters and associated valve, solenoid and switch combinations provided that at least two such combinations are employed so that at least one combination will always provide suction from the vacuum source 15. The valves 31, 32 and 33 may employ hinged covers or other mechanisms than pistons. The valve operating mechanisms 31d, 32d and 33d may be structurally different as long as the vacuum ports "a" and ambient air ports "b" are closed at pressures not defeated by the suction of the vacuum source 15 but within the bias overcoming force of the solenoids 61, 62 and 63.

Thus, it is apparent that there has been provided, in accordance with the invention, an ambient air backflushed filter vacuum that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A valve comprising:
    a pneumatically discrete housing having first and second parallel planar ports with different cross sectional areas, said ports being aligned on an axis perpendicular thereto;
    a bearing mounted inside said housing between said ports;
    an assembly comprising:
        a shaft aligned on said axis, extending through said ports and mounted for lengthwise reciprocation in said bearing; and
        first and second parallel plates mounted on said shaft with said bearing therebetween, said plates being spaced at a distance less than a distance between said planar ports, said first and second plates being shaped and sized to seal said first and second parallel ports, respectively, against pneumatic flow; and
    a spring coiled about said shaft between said bearing and one of said plates and biasing said assembly in a normal operating mode to simultaneously seal a smaller one of said ports and open a larger one of said ports, a tension of said spring being calibrated to allow said assembly to reciprocate in response to a threshold force applied inteiuiittently thereto to an actuated operating mode to simultaneously seal said larger one of said ports and open said smaller one of said ports.

2. A valve according to claim 1, said assembly further comprising:
    a sleeve disposed on said shaft and inside of said spring for reciprocation with said shaft in said bearing; and
    a pair of nuts threaded on opposite ends of said shaft and holding said plates in abutment against said sleeve.

3. A valve according to claim 2, said threshold force and said spring being coordinated to exert a first pressure against said smaller one of said ports in said normal operating mode and to exert a second pressure higher than said first pressure against said larger one of said ports in said actuated operating mode when said spring is fully compressed.

4. A valve according to claim 3, said first pressure being 2.3 psi and said second pressure being 4.0 psi.

5. A valve according to claim 3, each said assembly further comprising first and second gaskets fixed to distal faces of said first and second plates, respectively.

6. A valve according to claim 3, said threshold force being intermittently applied to said shaft by a solenoid.

7. A valve according to claim 6, said solenoid being electronically timed to pulse at predetermined intervals.

8. A valve according to claim 3, said larger one of said ports being connected in a pneumatically discrete path to a vacuum source.

9. A valve according to claim 3, said smaller one of said ports being connected in a pneumatically discrete path to a source of ambient air.

10. A valve according to claim 3, a ratio of said first pressure to said second pressure being 0.575:1.

11. A valve according to claim 3, said threshold force being intermittently applied to said shaft by an electromechanical device.

12. A valve according to claim 11, said electromechanical device being electronically timed to pulse at predetermined intervals.

\* \* \* \* \*